(12) United States Patent
Balakrishnan et al.

(10) Patent No.: US 10,061,757 B2
(45) Date of Patent: Aug. 28, 2018

(54) SYSTEMS, METHODS, AND COMPUTER-READABLE MEDIA FOR SEARCHING TABULAR DATA

(71) Applicant: Google LLC, Mountain View, CA (US)

(72) Inventors: Sreeram Viswanath Balakrishnan, Los Altos, CA (US); Alon Yitzchak Halevy, Los Altos, CA (US)

(73) Assignee: Google LLC, Mountain View, CA (US)

( * ) Notice: Subject to any disclaimer, the term of this patent is extended or adjusted under 35 U.S.C. 154(b) by 254 days.

(21) Appl. No.: 14/742,469

(22) Filed: Jun. 17, 2015

(65) Prior Publication Data

US 2016/0140188 A1     May 19, 2016

Related U.S. Application Data

(60) Provisional application No. 62/013,461, filed on Jun. 17, 2014.

(51) Int. Cl.
*G06F 17/30*     (2006.01)
*G06F 17/24*     (2006.01)

(52) U.S. Cl.
CPC ...... *G06F 17/241* (2013.01); *G06F 17/30389* (2013.01); *G06F 17/30392* (2013.01); *G06F 17/30424* (2013.01)

(58) Field of Classification Search
CPC ............. G06F 17/241; G06F 17/30389; G06F 17/30392; G06F 17/30424
See application file for complete search history.

(56) References Cited

U.S. PATENT DOCUMENTS

| | | | | |
|---|---|---|---|---|
| 6,101,492 | A * | 8/2000 | Jacquemin | G06F 17/30672 704/1 |
| 6,615,207 | B1 * | 9/2003 | Lawrence | G06F 17/30389 |
| 2002/0143749 | A1 * | 10/2002 | Hartel | G06F 17/3064 |
| 2004/0049730 | A1 * | 3/2004 | Ishizaka | G06F 17/246 715/213 |
| 2004/0162822 | A1 * | 8/2004 | Papanyan | G06F 17/30415 |

(Continued)

OTHER PUBLICATIONS

Michael Coughlan, "Searching Tabular Data", Mar. 20, 2014, pp. 303-326.*

*Primary Examiner* — Jared M Bibbee
(74) *Attorney, Agent, or Firm* — Fish & Richardson P.C.

(57) ABSTRACT

Systems, methods, and computer-readable media are provided for searching a tabular database. According to certain embodiments, search parameters for searching a tabular database are received from a user device and a row of a tabular database that corresponds to the search parameters is determined. In certain embodiments, the row may be determined by comparing the search parameters with a plurality of stored exemplar search queries, each of the plurality of stored exemplar search queries comprising a search query associated with a row and a column of the tabular database. A column of the tabular database that corresponds to the search parameters is determined by comparing the search parameters with the plurality of stored exemplar search queries. In certain embodiments, at least one cell of the tabular database is determined. The determined cell may be located at the intersection of the determined row and the determined column. A data element associated with the at least one cell is sent to the user device for display.

23 Claims, 8 Drawing Sheets

(56) References Cited

U.S. PATENT DOCUMENTS

| | | | | |
|---|---|---|---|---|
| 2006/0268726 A1* | 11/2006 | Alamaunu | ........... | H03M 13/154 370/242 |
| 2011/0012917 A1* | 1/2011 | Souza | .................... | G06Q 10/10 345/593 |
| 2013/0007019 A1* | 1/2013 | Yanase | ..................... | G06N 5/04 707/749 |
| 2013/0235066 A1* | 9/2013 | Souza | ............... | G06F 17/30247 345/593 |
| 2013/0290319 A1* | 10/2013 | Glover | ................ | G06F 17/3053 707/723 |
| 2014/0149841 A1* | 5/2014 | Magar | .................. | G06F 17/246 715/227 |
| 2014/0365481 A1* | 12/2014 | Novosel | ............ | G06F 17/30864 707/728 |

\* cited by examiner

California School District Funding in 2012

| District | Type | ADA | Federal | State | Local | Combined |
|---|---|---|---|---|---|---|
| Palo Alto | Unified | 11835 | 4034403 | 16579421 | 140391960 | 161005784 |
| Los Altos | Elementary | 4392 | 1005958 | 4188300 | 40084670 | 45278528 |
| Cupertino | Unified | 18377 | 3946566 | 40696541 | 95644860 | 140189967 |

FIG. 4

| Answer Column | Units | Query |
|---|---|---|
| Combined — 520 | $ — 530 | what is the funding for {Palo Alto}[col0] school district — 510<br>funding level for {Cupertino}[col0] schools |
| Federal | $ | how much Federal funding does {Los Altos}[col0] {Elementary}[col1] get? |
| ADA | # | size of {Cupertino}[col0] {Unified}[col1]<br>how many students in {Los Altos}[col0] school district |

SYSTEMS, METHODS, AND COMPUTER-READABLE MEDIA FOR SEARCHING TABULAR DATA

CROSS-REFERENCE TO RELATED APPLICATIONS

This application claims the benefit of priority to U.S. Provisional Patent Application No. 62/013,461, filed on Jun. 17, 2014, the entire disclosure of which is expressly incorporated herein by reference in its entirety.

BACKGROUND

The present disclosure relates generally to computerized systems and methods for searching data. More particularly, and without limitation, the present disclosure relates to systems, methods, and computer-readable media for searching tabular data.

A tabular database may allow a database administrator to conveniently maintain large amounts of relational data elements. Further, the database administrator may provide users with the ability to search for desired data elements stored within the tabular database.

SUMMARY

The present disclosure relates to embodiments for searching data, including tabular data. Moreover, embodiments of the present disclosure include systems, methods, and computer-readable media for searching tabular data. As will be appreciated, embodiments of the present disclosure may be implemented with any combination of hardware, software, and/or firmware, including computerized systems and methods embodied with processors or processing components.

In some embodiments, a computer-implemented system is provided for searching a tabular database. The system includes a memory device that stores a set of instructions and at least one processor. The at least one processor executes the instructions to receive, from a user device, search parameters for searching the tabular database. The at least one processor also executes the instructions to determine a row of the tabular database that corresponds to the search parameters by comparing the search parameters with a plurality of stored exemplar search queries, each of the plurality of stored exemplar search queries comprising a search query associated with a row and a column of the tabular database. The at least one processor further executes the instructions to determine a column of the tabular database that corresponds to the search parameters by comparing the search parameters with the plurality of stored exemplar search queries. Moreover, the at least one processor further executes the instructions to determine at least one cell of the tabular database, wherein the at least one cell is located at the intersection of the determined row and the determined column. Still further, the at least one processor executes the instructions to send a data element associated with the at least one cell to the user device for display.

In some embodiments of the present disclosure, a method is provided for searching a tabular database. The method includes receiving, from a user device, search parameters for searching the tabular database. The method also includes determining a row of the tabular database that corresponds to the search parameters by comparing the search parameters with a plurality of stored exemplar search queries, each of the plurality of stored exemplar search queries comprising a search query associated with a row and a column of the tabular database. The method further includes determining a column of the tabular database that corresponds to the search parameters by comparing the search parameters with the plurality of stored exemplar search queries. Further, the method includes determining at least one cell of the tabular database, wherein the at least one cell is located at the intersection of the determined row and the determined column. Moreover, the method includes sending a data element associated with the at least one cell to the user device for display.

In some embodiments of the present disclosure, a non-transitory computer-readable medium storing instructions is provided. The instructions, when executed by at least one processor, cause the at least one processor to perform operations including receiving, from a user device, search parameters for searching the tabular database, determining a row of the tabular database that corresponds to the search parameters by comparing the search parameters with a plurality of stored exemplar search queries, each of the plurality of stored exemplar search queries comprising a search query associated with a row and a column of the tabular database, determining a column of the tabular database that corresponds to the search parameters by comparing the search parameters with the plurality of stored exemplar search queries, determining at least one cell of the tabular database, wherein the cell is located at the intersection of the determined row and the determined column, and sending a data element associated with the at least one cell to the user device for display.

Additional aspects and aspects consistent with the present disclosure will be set forth in part in the description which follows, and in part will be obvious from the description, or may be learned by practice of aspects of the present disclosure, as claimed.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments and aspects.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Systems, methods, and computer-readable media are disclosed that are capable of permitting an administrator with domain expertise to provide exemplar queries that link columns and rows of a table or tabular database with search queries that are answered by those columns and rows. By enabling an administrator or other motivated user to provide these exemplar queries, critical human input can be used to address issues that may occur with various forms of automatic schema matching, such as converting natural language queries to database queries.

To minimize the number of exemplar queries required, the provided exemplar queries may be generalized using a variety of techniques, such as stop word removal, stemming, lemmatization, and other techniques. Once the exemplar queries have been generalized, they can immediately be used to match test queries to relevant parts of the table or tabular database. Using test queries enables the provider of the exemplar queries to determine the query coverage and the effectiveness of the generalization. If necessary, the provider can add additional exemplar queries to fill gaps that result from the generalization.

Systems, methods, and computer-readable media are disclosed that are capable of permitting users to search and identify relevant content from a tabular database. A user may submit search query to identify an answer to the search query in a table or tabular database. The system may identify a cell in the tabular database that corresponds to the search query by comparing the search query with one or more exemplar search queries. Each of the exemplar search queries may include an example search query that link columns and rows of a table or tabular database with search queries that are answered by those columns and rows. Each identified cell by the system and/or the data associated with that cell may be sent to the user's device for display. For example, the system may cause search results with the identified cell(s) and/or data element(s) to be presented for display on the user's device.

Annotated parameters may be stored with the exemplar search queries. For example, the annotated parameters may define a row or column of the tabular database that contain the answer to a user's search query.

Figure 1:
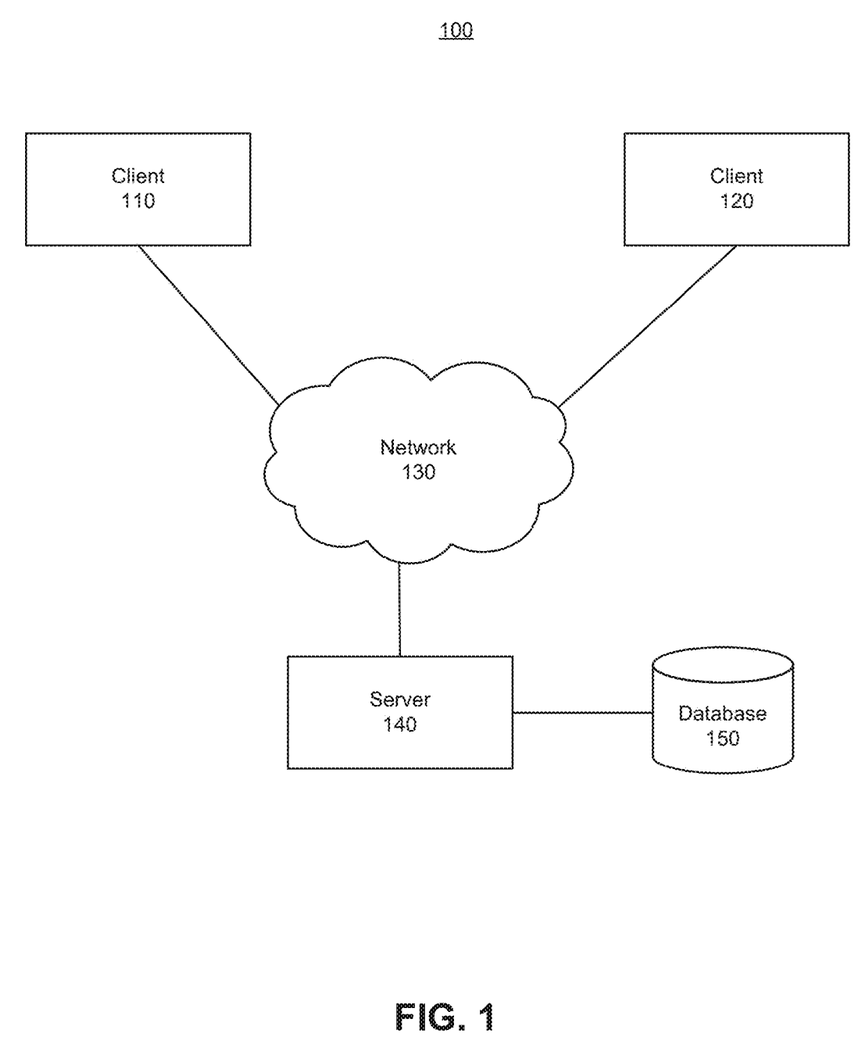
FIG. 1 illustrates an example system environment for implementing some embodiments and aspects of the present disclosure.

FIG. 1 is a block diagram of an example system environment 100 for implementing aspects of the present disclosure. The arrangement and number of components in system 100 is provided for purposes of illustration. Additional arrangements, number of components, and other modifications may be made, consistent with the present disclosure.

As shown in the example embodiment of FIG. 1, system environment 100 may include one or more user devices or clients 110, 120. By way of example, clients 110, 120 may include smartphones, tablets, netbooks, electronic readers, personal digital assistants, personal computers, laptop computers, desktop computers, large display devices, and/or other types of electronics or communication devices. In some embodiments, clients 110, 120 are implemented with hardware devices and/or software applications running thereon. Also, in some embodiments, client 110 or 120 may implement aspects of the present disclosure without the need for accessing another device, component, or network, such as network 130. In some embodiments, server 140 may implement aspects and features of the present disclosure without the need for accessing another device, component, or network 130. In yet other embodiments, clients 110, 120 may be configured to communicate to and/or through network 130 with other clients and components, such as server 140 and database 150, and vice-versa.

In some embodiments, network 130 may include any combination of communications networks. For example, network 130 may include the Internet and/or any type of wide area network, an intranet, a metropolitan area network, a local area network (LAN), a wireless network, a cellular communications network, etc. In some embodiments, clients 110, 120 may be configured to transmit requests (e.g., requests based on input provided by one or more users) or other data through network 130 to an appropriate server, such as, for example, server 140. For example, clients 110, 120 may be configured to transmit search queries to server 140. In some aspects, clients 110, 120 may also be configured to receive information from server 140 through network 130. For example, clients 110, 120 may be configured to receive data (e.g., HTML data including search results and/or data elements) responsive to search queries from server 140. Moreover, as described in more detail below, clients 110, 120 may be configured, for example, to receive, from server 140, data responsive to multiple queries by multiple users sent from a single client device or multiple client devices.

Server 140 may include one or more servers configured to communicate and interact with clients 110, 120 and database 150. In some embodiments, server 140 may implement or provide one or more search engines. Server 140 may be a general-purpose computer, a mainframe computer, or any combination of these components. In certain embodiments, server 140 may be standalone computing system or apparatus, or it may be part of a subsystem, which may be part of a larger system. For example, server 140 may represent distributed servers that are remotely located and communicate over a communications medium (e.g., network 130) or over a dedicated network, for example, a LAN. Server 140 may be implemented, for example, as a server, a server system comprising a plurality of servers, or a server farm comprising a load balancing system and a plurality of servers.

In some embodiments, a user can submit a query to a search engine within server 140. When the user submits a query, the query may be transmitted through network 130 to server 140. Server 140 may include, or may be connected to database 150 and a search engine. Server 140 may respond to the query by generating search results, which are transmitted through network 130 to client 110, 120 in a form that can be presented to the user (e.g., a search results web page to be displayed in a web browser running on client 110, 120).

In some embodiments, when the query is received by the search engine of server 140, the search engine identifies resources that match the query. The search engine may also identify a particular "snippet" or section of each resource that is relevant to the query (or of the highest ranked resources that are relevant to the query). The search engine may include an indexing engine that indexes resources (e.g., web pages, images, or news articles on the Internet) found in a corpus (e.g., a collection or repository of content), an index database that stores the index information, and a ranking engine (or other software) to rank the resources that match the query. The indexing engine can index information using traditional techniques. In some embodiments, the search engine (or indexing engine thereof) can index tabular data using the techniques of the present disclosure.

The ranking engine generally has access to one or more scoring functions that are, for example, associated with the ranking engine. The ranking engine selects a scoring function from the set of scoring functions. The ranking engine can base the selection on user input. Alternatively, the ranking engine can select a scoring function based on instructions received from a scoring functions evaluator. In some implementations, the ranking engine can select multiple scoring functions and send multiple sets of ranked search results, one corresponding to each selected scoring function, to client 110, 120.

In some embodiments, the ranking engine ranks search results that are responsive to the query by determining one or more signals for the search result and the query, sending those signals to one of the scoring functions, receiving a score from the scoring function for each search result, and then ranking the search results based on the received scores. The ranking engine and scoring functions can communicate according to commands specified in an application programming interface (API). In general, the API specifies interfaces used by the ranking engine and the scoring function to implement and invoke a series of commands for sharing data. For example, the API can specify a command used by a scoring function to receive scoring data from the ranking engine, or can specify a command used by a ranking engine to request a score from a scoring function. In some implementations, data is passed between the scoring function and the ranking engine in messages encoded according to a messaging format. The messaging format can be specified by the API, or can be separate from the API.

Examples of signals include information about the query itself, for example, the terms of the query, an identifier of the user who submitted the query, and a categorization of the user who submitted the query (e.g., the geographic location from where the query was submitted, the language of the user who submitted the query, interests of the user who submitted the query, or a type of client 110, 120 used to submit the query (e.g., mobile device, laptop, desktop)). The identification of the user can be, for example, a user name or the IP address of client 110, 120. The geographic location from where the query was submitted can be, for example, a continent, a country, a state, a city, or geographic coordinates, such as latitude and longitude.

Signals can also include information about the terms of the query, for example, the locations where a query term appears in the title, body, and text of anchors in a search result, where a query term appears in anchors pointing to the search result, how a term is used in the search result (e.g., in the title of the search result, in the body of the search result, or in a link in the search result), the term frequency (i.e., the number of times the term appears in a corpus of documents in the same language as the query divided by the total number of terms in the corpus), and the document frequency (i.e., the number of documents in a corpus of documents that contain the query term divided by the total number of documents in the corpus).

Further examples of signals include information about the search result, for example, a measure of the quality of the search result, the URL of the search result, the geographic location where the search result is hosted, when server 140 first added the search result to index database 150, the language of the search result, the size of the search result (e.g., number of tokens or file size), the length of the title of the search result, and the length of the text of source anchors for links pointing to the document.

Other examples of signals include information about anchor text for links pointing to the search result, for example, the text itself and the total number of tokens (e.g., words) in the anchor text. For example, if an anchor pointing to the search result has the text "NY" and another anchor has the text "New York," then the signals can include the text "NY" and "New York" as well as the number of tokens in the text: one from "NY" and two from "New York" for a total of three tokens. Other anchor signals for links pointing to the search result include the number of documents in the domain of the search result that have a link pointing to the search result with given anchor text, and the number of documents from different domains than the search result that have a link pointing to the search result with given anchor text.

The ranking engine may also provide additional information to the scoring function, for example, scoring parameters. In some implementations, server 140 receives the scoring parameters with the query.

Database 150 may include one or more logically and/or physically separate databases configured to store data. The data stored in database 150 may be received from servers 140, from clients 110, 120 and/or may be provided as input using conventional methods (e.g., data entry, data transfer, data uploading, etc.). The data stored in the database 150 may take or represent various forms including, but not limited to, documents, presentations, textual content, mapping and geographic information, rating and review information, pricing information, days and hours of operation information, news, audio files, video files, user profile information, and a variety of other electronic data, or any combination thereof. In some embodiments, database 150 may comprise an index database.

In some embodiments, database 150 may be implemented using a single computer-readable storage medium. In some embodiments, database 150 may be maintained in a network attached storage device, in a storage area network, or combinations thereof, etc. Furthermore, database 150 may be maintained and queried using numerous types of database software and programming languages, for example, SQL, MySQL, IBM DB2®, Microsoft Access®, PERL, C/C++, Java®, etc. Although FIG. 1 shows database 150 associated with server 140, database 150 may be a standalone database that is accessible via network 130 or database 150 may be associated with or provided as part of a system or environment that may be accessible to clients 110, 120 and/or other components.

Figure 2:
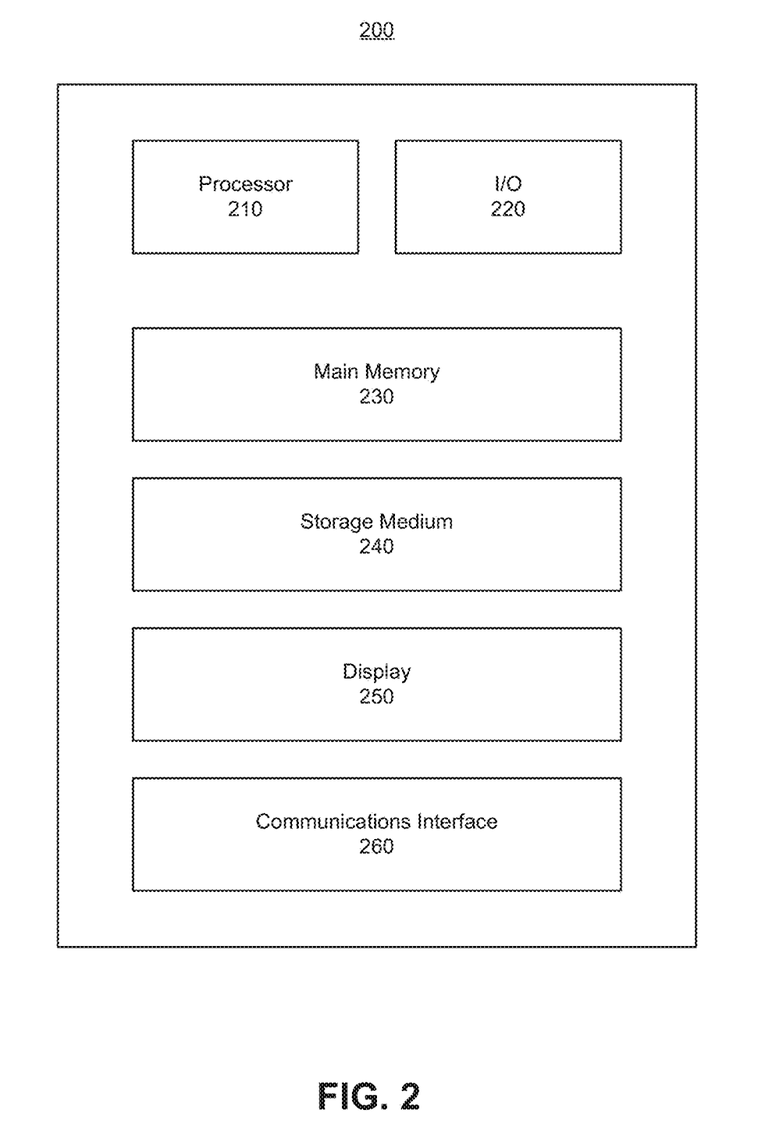
FIG. 2 illustrates an example electronic apparatus or system for implementing some embodiments and aspects of the present disclosure.

FIG. 2 is a block diagram of an example electronic apparatus or system 200 for implementing some embodiments and features of the present disclosure. By way of example, apparatus or system 200 may be used to implement clients 110, 120, server 140, and/or database 150 of FIG. 1. The arrangement and number of components in system 200 is provided for purposes of illustration. Additional arrangements, number of components, and other modifications may be made, consistent with the present disclosure.

As shown in FIG. 2, system 200 may include one or more processors 210 for executing instructions. Processors suitable for the execution of instructions include, by way of example, both general and special purpose microprocessors, and any one or more processors of any kind of digital computer. System 200 may also include one or more input/output (I/O) devices 220. By way of example, I/O devices 220 may include physical keyboards, virtual touch-screen keyboards, mice, joysticks, styluses, etc. In certain embodiments, system 200 may also be capable of receiving input through a microphone (not shown) using, for example, voice recognition applications.

As further illustrated in FIG. 2, system 200 may include one or more storage devices configured to store data and/or software instructions used by the one or more processors 210 to perform operations consistent with disclosed aspects. For example, system 200 may include main memory 230 configured to store one or more software programs that performs functions or operations when executed by the one or more processors 210. By way of example, main memory 230 may include NOR or NAND flash memory devices, Read Only Memory (ROM) devices, Random Access Memory (RAM) devices, etc. System 200 may also include storage medium 240. By way of example, storage medium 240 may include hard drives, solid state drives, tape drives, RAID arrays, etc. Although FIG. 2 shows only one main memory 230 and one storage medium 240, system 200 may include any number of main memories 230 and storage mediums 240. Further, although FIG. 2 shows main memory 230 and storage medium 240 as part of system 200, main memory 230 and/or storage medium 240 may be located remotely and system 200 may be able to access main memory 230 and/or storage medium 240 via network 130.

System 200 may also include one or more displays 250 for displaying data and information. Display 250 may be implemented using devices or technology, such as a cathode ray tube (CRT) display, a liquid crystal display (LCD), a plasma display, a light emitting diode (LED) display, a touch screen type display, and/or any other type of display known in the art.

System 200 may also include one or more communications interfaces 260. Communications interface 260 may allow software and data to be transferred between system 200, network 130, clients 110, 120, and/or other components. Examples of communications interface 260 may include a modem, a network interface (e.g., an Ethernet card), a communications port, a PCMCIA slot and card, etc, Communications interface 260 may transfer software and data in the form of signals, which may be electronic, electromagnetic, optical, or other signals capable of being received by communications interface 260, These signals may be provided to communications interface 260 via a communications path (not shown), which may be implemented using wire, cable, fiber optics, radio frequency ("RF") link, and/or other communications channels.

The disclosed embodiments are not limited to separate programs or computers configured to perform dedicated tasks. For example, server 140 may include main memory 230 that stores a single program or multiple programs. Additionally, server 140 may execute one or more programs located remotely from server 140. In some example aspects, server 140 may be capable of accessing separate web server(s) or computing devices that generate, maintain, and provide web sites and/or event creation and notification services. Clients 110 and/or 120 may function in a manner similar to server 140 and vice-versa.

Figure 3:
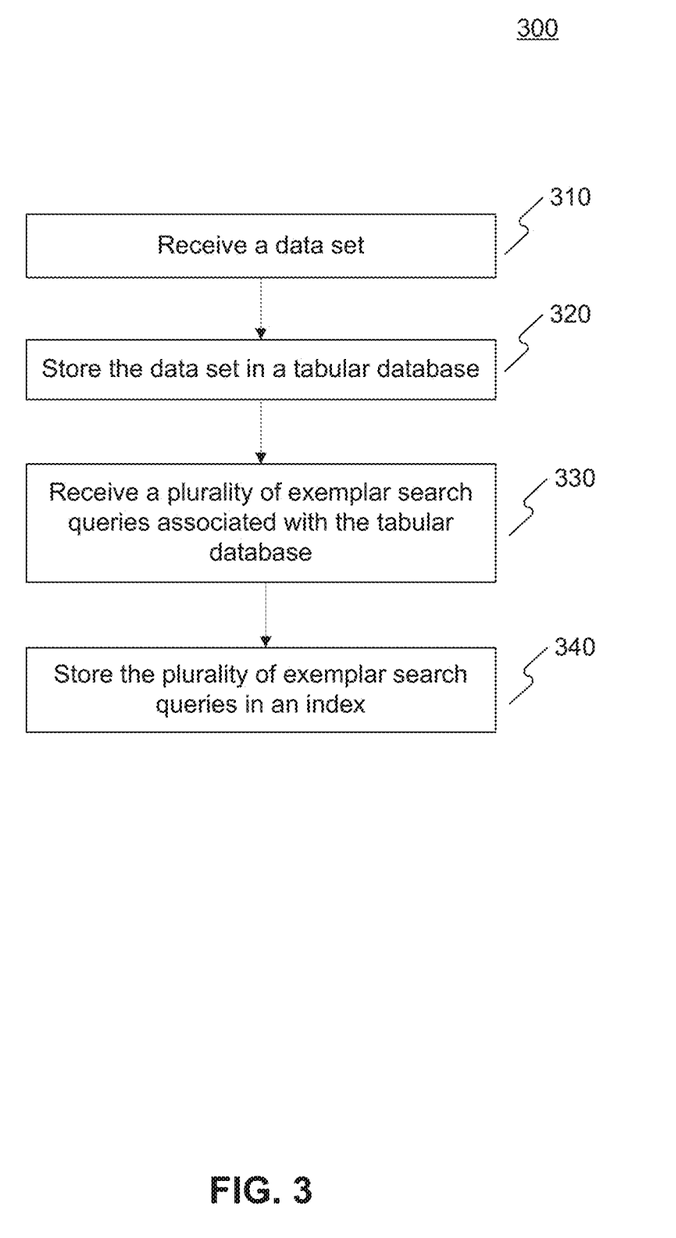
FIG. 3 illustrates an example method for searching tabular data according to some embodiments and aspects of the present disclosure.

FIG. 3 depicts a flowchart of an example method 300, consistent with some embodiments and aspects of the present disclosure. Method 300 may be implemented for gathering exemplary search queries and indexing tabular databases. In some embodiments, method 300 may be implemented as one or more computer programs executed by one or more processors. Moreover, in some embodiments, method 300 may be implemented by a server (e.g., server 140 having one or more processors executing one or more computer programs stored on a non-transitory computer readable medium) or a client (e.g., client 110, 120 having one or more processors executing one or more computer programs stored on a non-transitory computer readable medium). In some embodiments, method 300 may be implemented by a combination of a server and a client.

In some embodiments, example method 300 may include receiving a data set at 310. The data set may be received from a user, a third party, or other source, and include data in any form of user input. As an example, the data set may be received in the form of a comma-separated values (CSV) file, spreadsheet file, data table, SQL table, tabular database, etc. In some embodiments, the third party may be a client (e.g., client 110 or 120), a database administrator, a contractor, etc. Further to the aspect, the data set may be received at a server (e.g., server 140) through a network (e.g., network 130).

In some embodiments, example method 300 may include storing the data set in a tabular database at 320. In an embodiment, the data set may be stored in a tabular database on server 140 or in a database such as database 150.

Figure 4:
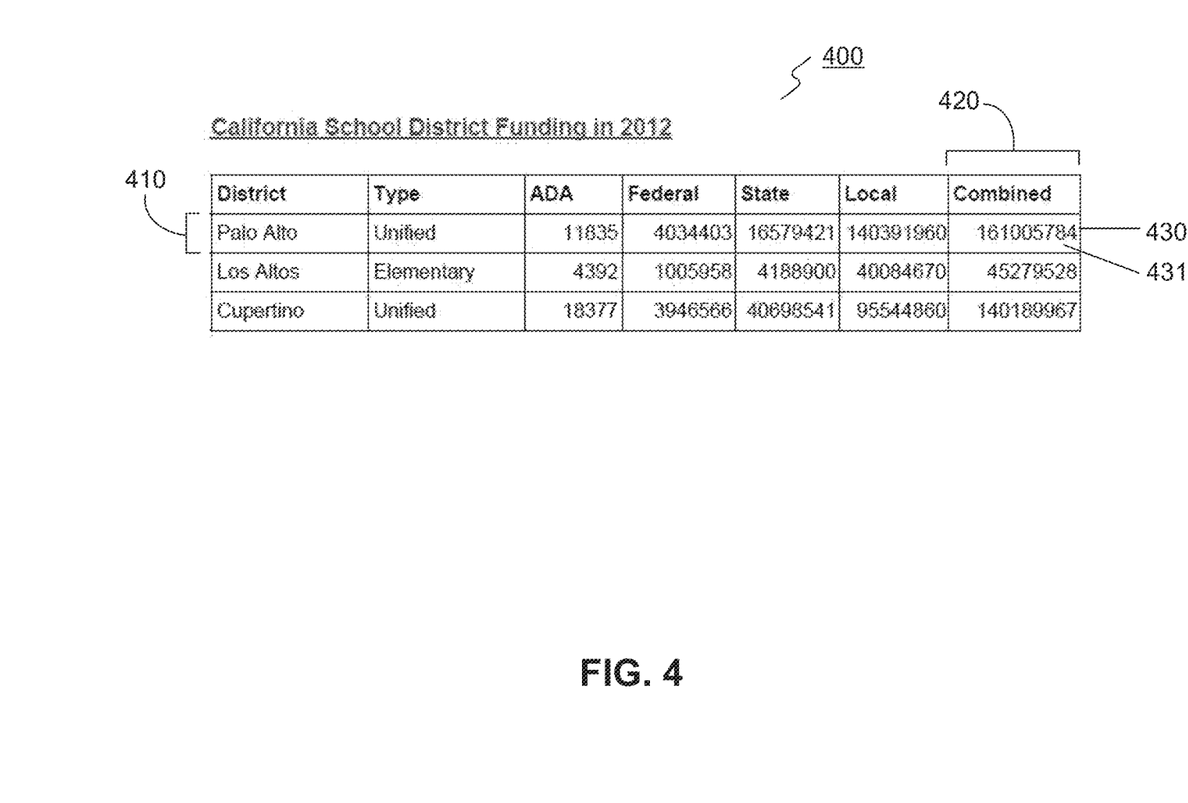
FIG. 4 illustrates an example implementation of a tabular database according to some embodiments and aspects of the present disclosure.

FIG. 4 depicts an example implementation of a tabular database such as tabular database 400 for storing a data set received from a third party. In an embodiment, tabular database 400 may comprise a plurality of rows 410 that extend horizontally along tabular database 400 and columns 420 that extend vertically along tabular database 400. Each intersection of a row 410 and a column 420 may correspond to a cell of tabular database 400 such as cell 430. Each cell 430 of tabular database 400 may contain a data element such as data element 431. As an example of the above, cell 430 at the intersection of row 410 and column 420 may contain data element "161005784."

Returning to FIG. 3, in some embodiments, example method 300 may optionally include providing the third party with at least one exemplar query, the at least one exemplar query comprising an exemplar query associated with a second tabular database that contains a data set similar to the data set stored in the tabular database. In an example, the third party may be provided with an exemplar query associated with a second tabular database that contains a data set similar to the data set stored in tabular database 400. In another example, the at least one exemplar query may be provided by a server (e.g., server 140) through a network (e.g., network 130). The third party may use the at least one exemplar query to create a plurality of exemplar search queries for tabular database 400.

In some embodiments, example method 300 may include receiving a plurality of exemplar search queries from the third party, each of the plurality of exemplar search queries comprising a search query associated with a row and a column of the tabular database at 330. As an example, each of the plurality of exemplar search queries received from the third party may be associated with a row 410 and a column 420 of tabular database 400. As another example, the plurality of exemplar search queries may be received at a server (e.g., server 140) through a network (e.g., network 130).

As shown in FIG. 3, example method 300 may include storing the plurality of exemplar search queries in an index at 340. In an embodiment, storing the plurality of exemplar search queries in the index may comprise storing the plurality of exemplar search queries in a data table, an index database, or other suitable storage. As an example, the index may be stored on a server (e.g., server 140) or database (e.g., database 150).

Figure 5:
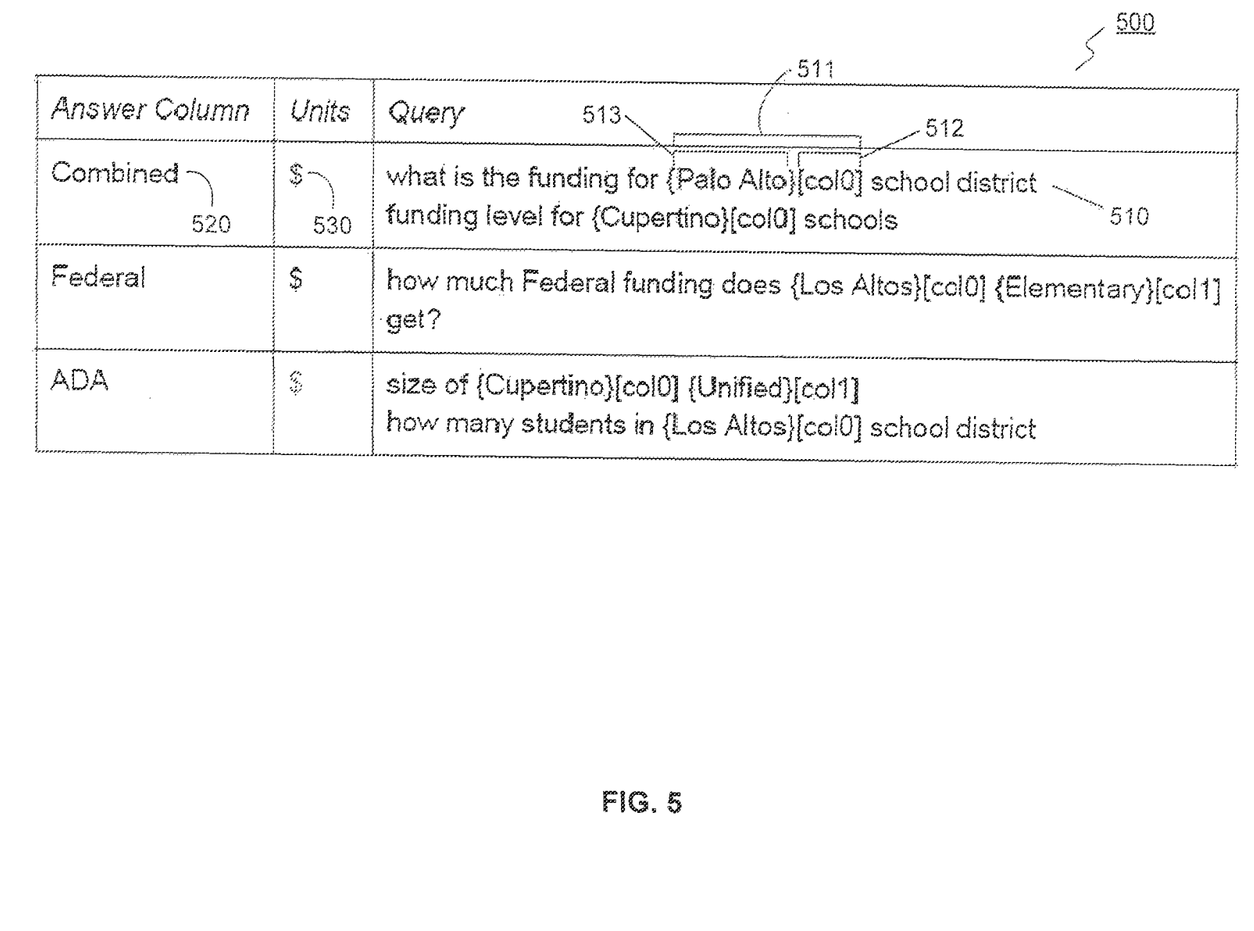
FIG. 5 illustrates an example implementation of a data table containing a plurality of exemplar search queries according to some embodiments and aspects of the present disclosure.

FIG. 5 depicts an example implementation of a data table 500 containing a plurality of exemplar search queries 510. In this example, an exemplar search query may be "what is the funding for {Palo Alto}[col0] school district."

In accordance with the present disclosure, the plurality of exemplar search queries 510 may be received from a user, a third party, or other source. As a non-limiting example, the user of third party may be a user of a client device (e.g., client 110 or 120), a database administrator, a contractor, etc. Consistent with the present disclosure, the exemplar search queries 510 may be received, for example, at a server (e.g., server 140) through a network (e.g., network 130).

In some embodiments, each of the plurality of exemplar search queries 510 may contain one or more parameters, such as annotated parameter 511. For example, annotated parameter 511 may be a marked-up portion of exemplar search query 510 or otherwise associated with exemplary search query 510 (e.g., metadata). In some embodiments, annotated parameter 511 includes an exemplar search query parameter 513 and an identifier 512, as shown in the example of FIG. 5. Exemplar search query parameter 513 may correspond to search parameter(s) received from a user device for a data element (e.g., data element 431). Exemplar search query parameter 513 may be used to identify a row (e.g., row 410 in FIG. 4) of the tabular database (e.g., tabular database 400) that corresponds to the search parameter received from the user device for the data element. Identifier 512 may identify a column (e.g., column 420 in FIG. 4) of the tabular database associated with the search parameter(s).

Referring again to the example in FIG. 5, annotated parameter 511 may be "{Palo Alto}[col0]" wherein "Palo Alto" may be exemplar search query parameter 513 and "[col0]" may be identifier 512. In the example, "[col0]" may identify the column titled "District" in tabular database 400 of FIG. 4 where the exemplar search query parameter "Palo Alto" may be located.

In some embodiments, data table 500 may contain a plurality of column identifiers 520. Each column identifier 520 may correspond to one or more exemplar search queries 510. Column identifier 520 may be used to identify a column (e.g., column 420) of the tabular database (e.g., tabular database 400) that is associated with the one or more exemplar search queries 510.

Referring to the example in FIG. 5, column identifier "Combined" may correspond to exemplar search queries "what is the funding for {Palo Alto}[col0] school district" and "funding level for {Cupertino}[col0] schools." In the example, column identifier "Combined" may identify the column 420 titled "Combined" in tabular database 400 of FIG. 4 that is associated with exemplar search queries "what is the funding for {Palo Alto}[col0] school district" and "funding level for {Cupertino}[col0] schools."

Data table 500 may also include a plurality of unit identifiers 530. Each unit identifier 530 may identify a unit of measurement corresponding to the data element. As shown in the example of FIG. 5, unit identifier "$" in data table 500 may identify the unit of measurement that corresponds to data element 431 of FIG. 4.

Returning to FIG. 3, storing the plurality of exemplar search queries in the index may comprise storing the plurality of exemplar search queries in metadata associated with the tabular database. As an example, the plurality of exemplar search queries 510 may be stored in metadata associated with tabular database 400.

In some embodiments, example method 300 may optionally include receiving an input for generalizing at least one of the received plurality of exemplar search queries using a variety of techniques, such as stop word removal, stemming, lemmatization, and other techniques. Each generalization technique may be used individually or in any combination thereof. For example, stop word removal may include filtering out words from the exemplar search queries that may add little to no value in matching the columns and rows of the tabular database with search queries that are answered by those columns and rows. "The," "a," "an," "it," "is," and "to," for example, may be stop words that are removed as part of generalizing the exemplar search queries. As another example, stemming may include reducing inflected or derived words to their stem, base or root form. As a further example, lemmatization may include grouping together different inflected forms of a word so they can be analyzed as a single item. "Size of," "number of," and "how many," for example, may be grouped together and analyzed as a single set of words that all have a similar meaning.

In some embodiments, the received input for generalizing the at least one of the received plurality of exemplar search queries may include a selection of one or more inflected words in the at least one exemplar search query to be reduced to one of a base form, a root form, and a stem form of the one or more inflected words. An inflected word in the received plurality of exemplar search queries (e.g., exemplar search query 510) may be, but not limited to, a base, root, or stem word wherein the form of the word has been changed to express a particular grammatical function or attribute. As an example, the base, root, or stem word may have been changed to express a particular grammatical function or attribute such as tense, mood, person, number, case, or gender. The input selects the one or more inflected words to be reduced to their base form, root form, or stem form.

Figure 6:
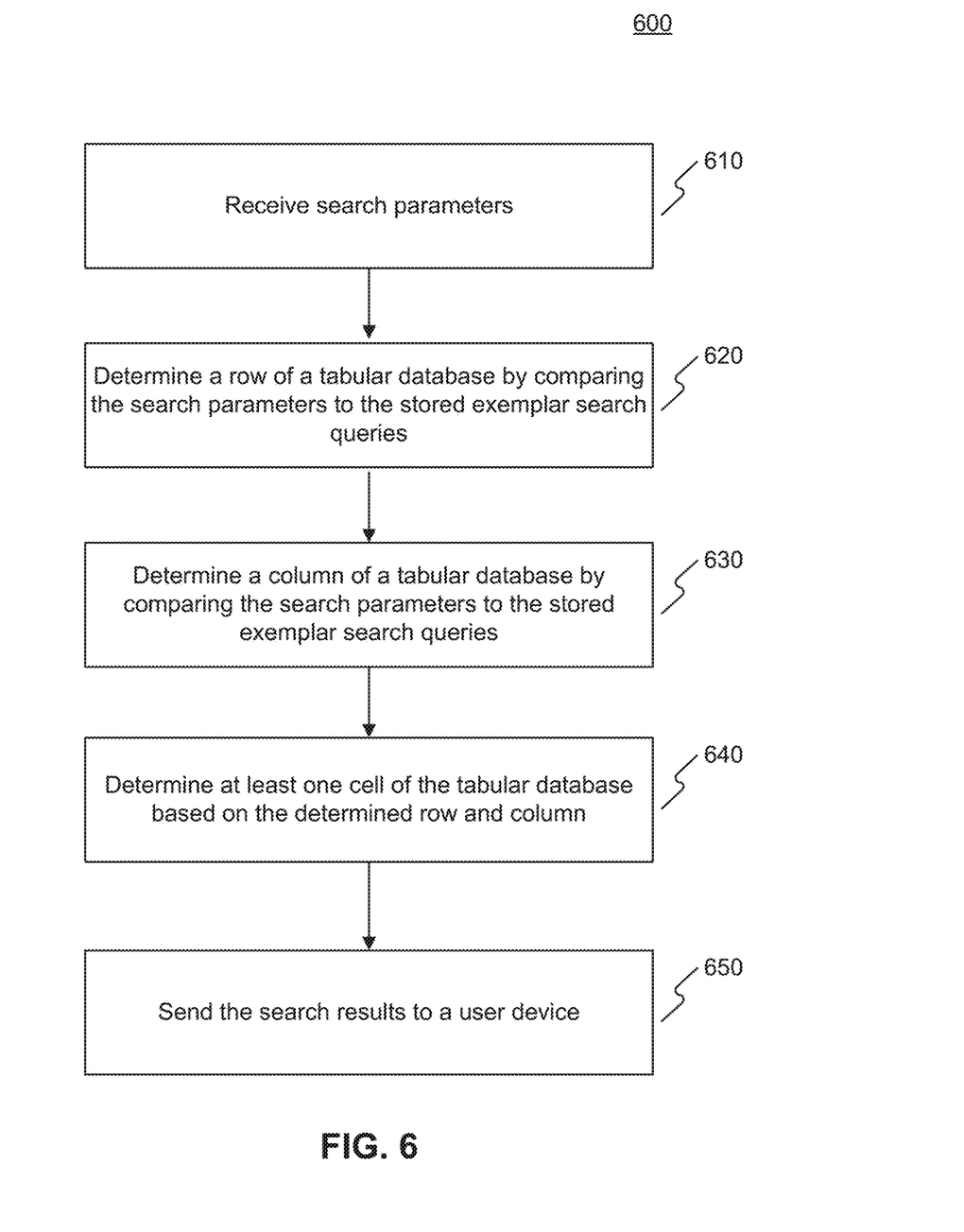
FIG. 6 illustrates another example method for searching tabular data according to some embodiments and aspects of the present disclosure.

FIG. 6 depicts a flowchart of an example method 600, consistent with some embodiments of the present disclosure. Method 600 may be implemented for searching tabular data. In some embodiments, method 600 may be implemented as one or more computer programs executed by a processor. For example, method 600 may be implemented by a server (e.g., server 140 having one or more processors executing one or more computer programs stored on a non-transitory computer readable medium), or a client (e.g., client 110, 120 having one or more processors executing one or more computer programs stored on a non-transitory computer readable medium). In some embodiments, method 600 may be implemented by a combination of a server and a client.

As shown in FIG. 6, example method 600 may include receiving, from a user device (e.g., client 110 or 120), a search query including search parameters for a data element at 610. The search parameters may be comprised in any form of user input. For example, the search parameters may include a text input received from a physical or virtual keyboard of the user device, an audio input received from a microphone of the user device, image data received from a camera of the user device, proximity data received from a touch screen display of the user device, etc. As one example, a user may enter text representative of search parameters for searching for a data element of a tabular database (e.g., data element 431).

Figure 7:
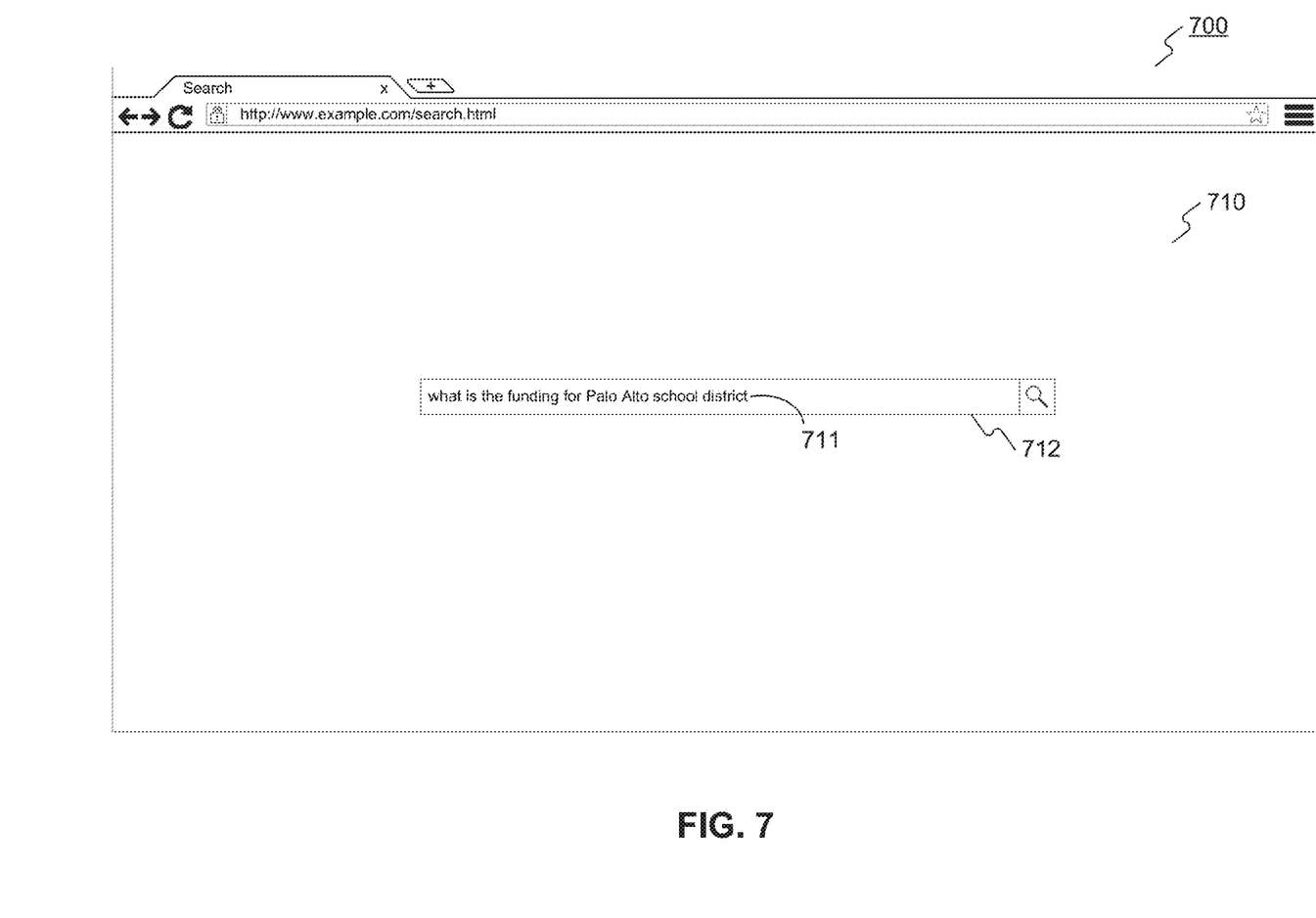
FIG. 7 illustrates an example user device for displaying a data element according to some embodiments and aspects of the present disclosure.

As noted above, the search parameters may be received from, for example, a client 110 or 120. FIG. 7 depicts an example implementation of a user device 700. User device 700 may be configured in the manner described above with respect to apparatus or system 200 of FIG. 2, and may include, for example, one or more displays 250.

As shown in FIG. 7, a user may enter search parameters (e.g., search parameters 711) for the data element at search entry field 712 on web page or other interface 710, For example, a user may enter the search parameters "what is the funding for Palo Alto school district" at search entry field

712. In an aspect, search parameters 711 may then be received at a server (e.g., server 140 with a search engine) from user device 700 through a network (e.g., network 130).

Returning to FIG. 6, example method 600 may include determining a row of a tabular database that corresponds to the search parameters by comparing the search parameters with a plurality of stored exemplar search queries at 620. As described above, each of the plurality of stored exemplar search queries may include a search query associated with a row and a column of the tabular database. The received search parameters (e.g., search parameters 711) may be compared with a plurality of exemplar search queries (e.g., exemplar search queries 510) stored in a data table (e.g., data table 500). As an example, the received search parameters "what is the funding for Palo Alto school district" may be compared against exemplar search queries such as "what is the funding for {Palo Alto}[col0] school district," "size of {Cupertino}[col0] {Unified}[col1]," etc. of FIG. 5.

As disclosed above with reference to the examples of FIGS. 4 and 5, the plurality of exemplar search queries 510 stored in data table 500 may be search queries that are associated with a row (e.g., row 410) and a column (e.g., column 420) of a tabular database (e.g., tabular database 400). As an example, exemplar search query "what is the funding for {Palo Alto}[col0] school district" may be a search query associated with the row of tabular database 400 of FIG. 4 containing "Palo Alto" in the "District" column. Thus, it may be determined that the received search parameters "what is the funding for Palo Alto school district" may correspond to the row 410 of tabular database 400 containing "Palo Alto" in the "District" column when the search parameters are compared with the exemplar search query "what is the funding for {Palo Alto}[col0] school district."

Referring again to the example of FIG. 6, the determining at 620 may be aided by the use of annotated parameters associated with the plurality of exemplar search queries. As described above, the annotated parameter (e.g., annotated parameter 511) may be a marked-up portion of the exemplar search query (or provided as metadata, for example) that includes an exemplar search query parameter (e.g., exemplar search query parameter 513) and an identifier (e.g., identifier 512). Further, the exemplar search query parameter may correspond to one of the search parameters (e.g., search parameters 711) received from the user device (e.g., user device 700). The exemplar search query parameter may identify a row of the tabular database that corresponds to the search parameter received from the user device for the data element (e.g., data element 431). Moreover, the identifier may identify the column in which the exemplar search query parameter may be located in the tabular database.

For instance, the annotated parameter may be "{Palo Alto}[col0]", as shown in FIG. 5, where "Palo Alto" may be the exemplar search query parameter and "[col0]" may be the identifier. In the example, "[col0]" may identify the column titled "District" in tabular database 400 of FIG. 4, where the exemplar search query parameter "Palo Alto" may be located.

Example method 600 of FIG. 6 may include determining a column of the tabular database that corresponds to the search parameters by comparing the search parameters with the plurality of stored exemplar search queries at 630, In an embodiment, the received search parameters (e.g., search parameters 711) may be compared with the plurality of exemplar search queries (e.g., exemplar search queries 510) stored in the data table (e.g., data table 500). As an example, the received search parameters "what is the funding for Palo Alto school district" in FIG. 7 may be compared against a plurality of exemplar search queries such as "what is the funding for {Palo Alto}[col0] school district," "size of {Cupertino}[col0] {Unified}[col1]," etc. of FIG. 5.

The plurality of exemplar search queries may be associated with a column (e.g., column 420) of the tabular database (e.g., tabular database 400). Further, a column identifier (e.g., column identifier 520) may correspond to one or more of the plurality of exemplar search queries. Additionally, the column identifier may identify the column of the tabular database that is associated with the one or more exemplar search queries, Thus, as an example, column identifier 520 "Combined" from data table 500 in FIG. 5 may correspond to the exemplar search query 510 "what is the funding for {Palo Alto}[col0] school district." Column identifier 520 "Combined" may identify the column 420 titled "Combined" in the tabular database 400 of FIG. 4 that is associated with the exemplar search query 510 "what is the funding for {Palo Alto}[col0] school district."

Referring again to FIG. 6, example method 600 may include determining at least one cell of the tabular database at 640. In some embodiments, more than one cell may be identified (e.g. where more than one specific row or column or intersection is identified based on the search parameters). The at least one determined cell may be located at the intersection of the determined row and the determined column. In some embodiments, the intersection of the determined row (e.g., row 410) and the determined column (e.g., column 420) may define a cell (e.g., cell 430) of the tabular database (e.g., tabular database 400). As an example, the determined cell may be located at the intersection of the determined row containing "Palo Alto" and the determined column "Combined" of the tabular database 400 in FIG. 4. In the example, the determined cell may contain the data element "161005784."

Example method 600 may include sending a data element associated with the at least one cell to the user device for display at 650. In an example, the data element may be sent by the server (e.g., server 140) to the user device (e.g., user device 700) through the network (e.g., network 130). As an example, data element "161005784" may be sent to the user device for display.

Figure 8:
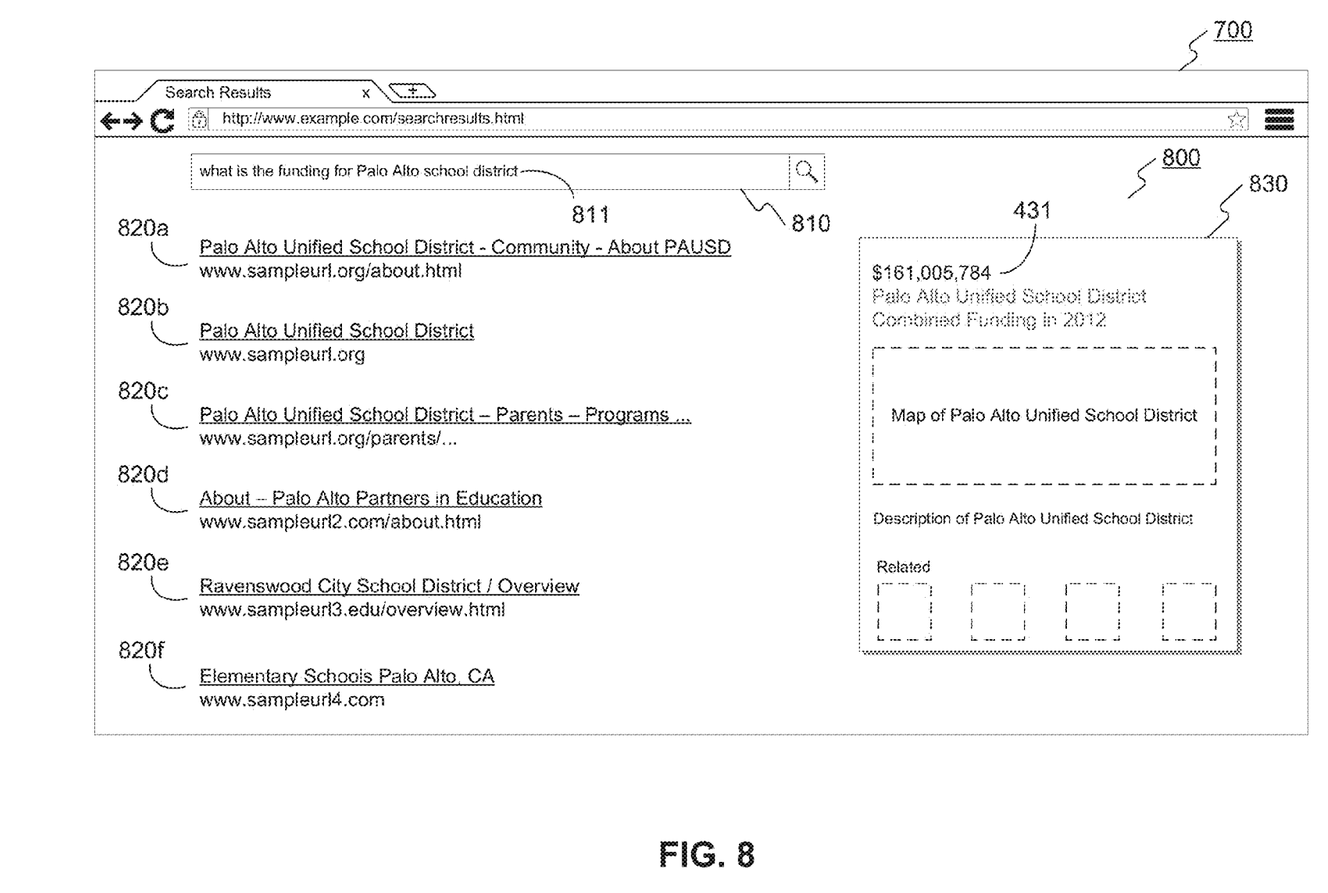
FIG. 8 illustrates an example user device for displaying a data element according to some embodiments and aspects of the present disclosure.

In some embodiments, the data element may be sent to a user device for display on a web page that includes one or more search results for an Internet search. FIG. 8 depicts an example implementation of displaying the data element on a user device, such as user device 700. In the example of FIG. 8, a data element, such as data element 431 of FIG. 4, may be displayed on a web page 800 on user device 700. Web page 800 may also include one or more search results 820*a-f* for an Internet search 811. Internet search 811 may be based on search parameters 711 received from user device 700.

Further, in some embodiments, data element 431 may be displayed on web page 800 along with a unit identifier (e.g., unit identifier 530) that identifies a unit of measurement corresponding to data element 431. As an example, the data element "161005784" may be displayed on web page 800 along with the unit identifier "$." As such, data element 431 may be displayed, for example, as a U.S. Dollar value.

As shown in FIG. 8, data element 431 may be displayed on web page 800 along with a search entry field 810. In addition, data element 431 may be displayed in an information panel, such as information panel 830, on web page 800. Information panel 830 may be provided on a portion of web page 800, alongside at least a portion of the one or more search results 820*a-f*. Information panel 830 may contain additional data, such as data related to data element 431, data related to the tabular database (e.g., tabular database 400), data related to Internet search 811, data related to the one or more search results 820*a-f*, and/or data related to tabular databases similar to the tabular database containing data element 431.

Other embodiments will be apparent from this disclosure. For example, in some embodiments, method 600 of FIG. 6 may alternatively comprise determining a first column and a second column of the tabular database that correspond to the search parameters by comparing the search parameters with the plurality of stored exemplar search queries. In addition, in some embodiments, determining the cell may comprise determining a first cell and a second cell of the tabular database, the first cell containing a first data element and the second cell containing a second data element, where the first cell is located at an intersection of the determined row and the determined first column and the second cell is located at an intersection of the determined row and the determined second column. Further, sending data and/or search results to a user device for display may comprise sending the first data element and the second data element to the user device for display.

Embodiments of the present disclosure include computer-implemented methods, tangible non-transitory computer-readable mediums, and computer-implemented systems. The computer-implemented methods may be executed, for example, by one or more processors that receive instructions from a non-transitory computer-readable storage medium. Similarly, systems consistent with the present disclosure may include at least one processor and memory, and the memory may be a non-transitory computer-readable storage medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, and any other known physical storage medium. Singular terms, such as "memory" and "computer-readable storage medium," may additionally refer to multiple structures, such a plurality of memories and/or computer-readable storage mediums.

As referred to herein, a "memory" may comprise any type of computer-readable storage medium unless otherwise specified. A computer-readable storage medium may store instructions for execution by a processor, including instructions for causing the processor to perform steps or stages consistent with an aspect herein. Additionally, one or more computer-readable storage mediums may be utilized in implementing a computer-implemented method. The term "computer-readable storage medium" should be understood to include tangible items and exclude carrier waves and transient signals.

While the present disclosure provides example embodiments of one or more processes or apparatuses, it will be appreciated that other processes or apparatuses can be implemented or adopted to be within the scope of the accompanying claims.

The foregoing description has been presented for purposes of illustration. It is not exhaustive and is not limited to the precise forms or aspects disclosed. Modifications and adaptations of the aspects will be apparent from consideration of the specification and practice of the disclosed aspects. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system or existing communications software.

Moreover, while illustrative aspects have been described herein, the scope includes any and all aspects having equivalent elements, modifications, omissions, combinations (e.g., of aspects across various aspects), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps and/or inserting or deleting steps. It is intended, therefore, that the specification and examples be considered as example only, with a true scope and spirit being indicated by the following claims and their full scope of equivalents.

What is claimed is:

1. A computer-implemented system, comprising:
   at least one data storage device storing:
      a data set in a tabular database; and
      a plurality of exemplar search queries that are associated with the data set and stored in a first data structure;
   at least one memory device that stores instructions; and
   at least one processor that executes the instructions to perform operations comprising:
      receiving, by the system, search parameters from a user device;
      comparing the search parameters with the plurality of exemplar search queries stored in the first data structure, each of the plurality of exemplar search queries being linked with a query column of the tabular database and being linked with an answer column of the tabular database that includes an answer to the exemplar search query, the tabular database being different than the first data structure;
      based on the comparing, identifying an exemplar search query stored in the first data structure that matches the search parameters;
      identifying a row of the tabular database, based on the row containing a value in a query column of the tabular database that corresponds to the search parameters and the matching exemplar search query;
      identifying at least one cell of the tabular database, the at least one cell being located at an intersection of the identified row and an answer column of the tabular database that is linked with the matching exemplar search query; and
      sending, by the system, at least one data element associated with the at least one cell to the user device for display.

2. The computer-implemented system according to claim 1, wherein the at least one processor further executes the instructions to identify the row of the tabular database by comparing the search parameters with at least one annotated parameter of the plurality of exemplar search queries stored in the first data structure.

3. The computer-implemented system according to claim 2, wherein the at least one annotated parameter identifies a query column of the tabular database that contains the search parameters that correspond to the identified row.

4. The computer-implemented system according to claim 1, wherein the at least one processor further executes the instructions to send the at least one data element to the user device for display on a web page that includes one or more search results for an Internet search.

5. The computer-implemented system according to claim 4, wherein the at least one data element is displayed in an information panel, the information panel comprising a portion of the web page alongside at least a portion of the one or more search results.

6. The computer-implemented system according to claim 1, wherein the first data structure is a data table.

7. The computer-implemented system according to claim 1, wherein the first data structure includes metadata associated with the tabular database.

8. The computer-implemented system according to claim 1, wherein the at least one processor further executes the instructions to receive an input for generalizing at least one of the plurality of exemplar search queries, the input including:
   a selection of one or more inflected words in the at least one exemplar search query to be reduced to one of a base form, a root form, and a stem form of the one or more inflected words.

9. The computer-implemented system according to claim 1, wherein the at least one processor further executes the instructions to provide at least one exemplar query, the at least one exemplar query comprising an exemplar query associated with a second tabular database that contains a data set similar to the data set stored in the tabular database.

10. The computer-implemented system according to claim 1, wherein the at least one processor further executes the instructions to perform operations comprising:
   determining a first column and a second column of the tabular database that correspond to the search parameters by comparing the search parameters with the plurality of stored exemplar search queries;
   wherein identifying the at least one cell of the tabular database comprises identifying a first cell and a second cell of the tabular database, the first cell containing a first data element and the second cell containing a second data element, wherein the first cell is located at an intersection of the identified row and the determined first column and the second cell is located at an intersection of the identified row and the determined second column; and
   wherein sending the at least one data element comprises sending the first data element and the second data element to the user device for display.

11. A method performed by one or more processors and comprising:
   receiving, by a computer-implemented system, search parameters from a user device;
   accessing, by the system, at least one data storage device storing:
      a data set in a tabular database; and
      a plurality of exemplar search queries that are associated with the data set and stored in a first data structure;
   comparing the search parameters with the plurality of exemplar search queries stored in the first data structure, each of the plurality of exemplar search queries being linked with a query column of the tabular database and being linked with an answer column of the tabular database that includes an answer to the exemplar search query, the tabular database being different than the first data structure;
   based on the comparing, identifying an exemplar search query stored in the first data structure that matches the search parameters;
   identifying a row of the tabular database, based on the row containing a value in a query column of the tabular database that corresponds to the search parameters and the matching exemplar search query;
   identifying at least one cell of the tabular database, the at least one cell being located at an intersection of the identified row and an answer column of the tabular database that is linked with the matching exemplar search query; and
   sending, by the system, at least one data element associated with the at least one cell to the user device for display.

12. The method according to claim 11, wherein identifying the row comprises comparing the search parameters with at least one annotated parameter of the plurality of exemplar search queries stored in the first data structure.

13. The method according to claim 12, wherein the at least one annotated parameter identifies a query column of the tabular database that contains the search parameters that correspond to the identified row.

14. The method according to claim 11, wherein sending the data element to the user device for display comprises sending the at least one data element to the user device for display on a web page that includes one or more search results for an Internet search.

15. The method according to claim 14, wherein the at least one data element is displayed in an information panel, the information panel comprising a portion of the web page alongside at least a portion of the one or more search results.

16. The method according to claim 11, wherein the first data structure is a data table.

17. The method according to claim 11, wherein the first data structure includes metadata associated with the tabular database.

18. The method according to claim 11, further comprising:
   receiving an input for generalizing at least one of the plurality of exemplar search queries, the input including a selection of one or more inflected words in the at least one exemplar search query to be reduced to one of a base form, a root form, and a stem form of the one or more inflected words.

19. The method according to claim 11, further comprising:
   providing at least one exemplar query, the at least one exemplar query comprising an exemplar query associated with a second tabular database that contains a data set similar to the data set stored in the tabular database.

20. The method according to claim 11, further comprising:
   determining a first column and a second column of the tabular database that correspond to the search parameters by comparing the search parameters with the plurality of stored exemplar search queries;
   wherein identifying the at least one cell of the tabular database comprises identifying a first cell and a second cell of the tabular database, the first cell containing a first data element and the second cell containing a second data element, wherein the first cell is located at an intersection of the identified row and the determined first column and the second cell is located at an intersection of the identified row and the determined second column; and wherein sending the at least one data element comprises sending the first data element and the second data element to the user device for display.

21. A non-transitory computer-readable medium comprising instructions that, when executed by at least one processor, cause the at least one processor to perform operations including:

receiving, by a computer-implemented system, search parameters from a user device;

accessing, by the system, at least one data storage device storing:
- a data set in a tabular database; and
- a plurality of exemplar search queries that are associated with the data set and stored in a first data structure;

comparing the search parameters with the plurality of exemplar search queries stored in the first data structure, each of the plurality of exemplar search queries being linked with a query column of the tabular database and being linked with an answer column of the tabular database that includes an answer to the exemplar search query, the tabular database being different than the first data structure;

identifying a row of the tabular database, based on the row containing a value in a query column of the tabular database that corresponds to the search parameters and the matching exemplar search query;

identifying at least one cell of the tabular database, the at least one cell being located at an intersection of the identified row and an answer column of the tabular database that is linked with the matching exemplar search query; and sending, by the server system, at least one data element associated with the at least one cell to the user device for display.

22. The non-transitory computer-readable medium according to claim 21, wherein identifying the row comprises comparing the search parameters with at least one annotated parameter of the plurality of exemplar search queries stored in the first data structure.

23. The non-transitory computer-readable medium according to claim 21, wherein sending the at least one data element to the user device for display comprises sending the at least one data element to the user device for display on a web page that includes one or more search results for an Internet search.

* * * * *

UNITED STATES PATENT AND TRADEMARK OFFICE
CERTIFICATE OF CORRECTION

PATENT NO. : 10,061,757 B2
APPLICATION NO. : 14/742469
DATED : August 28, 2018
INVENTOR(S) : Balakrishnan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this
Fourteenth Day of May, 2019

Andrei Iancu
*Director of the United States Patent and Trademark Office*